US010200861B2

(12) United States Patent
Nair et al.

(10) Patent No.: US 10,200,861 B2
(45) Date of Patent: Feb. 5, 2019

(54) VERIFICATION OF CELL AUTHENTICITY IN A WIRELESS NETWORK USING A SYSTEM QUERY

(71) Applicant: Alcatel-Lucent USA Inc., Murray Hill, NJ (US)

(72) Inventors: Suresh P. Nair, Whippany, NJ (US); Semyon Mizikovsky, Morganville, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 56 days.

(21) Appl. No.: 15/383,715

(22) Filed: Dec. 19, 2016

(65) Prior Publication Data

US 2018/0124602 A1 May 3, 2018

Related U.S. Application Data

(60) Provisional application No. 62/414,373, filed on Oct. 28, 2016.

(51) Int. Cl.
*H04W 12/06* (2009.01)
*H04W 48/20* (2009.01)
(Continued)

(52) U.S. Cl.
CPC ............ *H04W 12/06* (2013.01); *H01Q 1/243* (2013.01); *H04W 4/025* (2013.01); *H04W 12/04* (2013.01);
(Continued)

(58) Field of Classification Search
CPC ..... H04W 12/04; H04W 4/025; H04W 12/06; H04W 12/08; H04W 72/0406;
(Continued)

(56) References Cited

U.S. PATENT DOCUMENTS 7,808,958 B1 10/2010 Hernacki et al.
8,351,900 B2 1/2013 Lotvonen et al.
(Continued)

FOREIGN PATENT DOCUMENTS

EP        3070970 A1    9/2016
WO   WO2016048575 A1   3/2016

OTHER PUBLICATIONS

Tobarra, Llanos, et al., "Application of Formal Methods to the Analysis of Web Services Security," Formal Techniques for Computer Systems and Business Processes. Springer Berlin Heidelberg, 2005, pp. 215-229.

(Continued)

*Primary Examiner* — Michael Y Mapa
(74) *Attorney, Agent, or Firm* — Mendelsohn Dunleavy, P.C.; Yuri Gruzdkov

(57) ABSTRACT

We disclose various embodiments that enable a mobile terminal to authenticate a base station before the mobile terminal proceeds to attach to the corresponding network and/or camp on the corresponding cell, e.g., during the initial network selection and attachment or during an idle mode. In an example embodiment, the authentication processing includes the mobile terminal generating and sending to a candidate base station a system query with a nonce. The candidate base station is deemed to be authentic only if the acknowledgement generated and transmitted in response to the system query includes a copy of the nonce properly signed by a digital signature generated using one or more security keys. In some embodiments, the system query may also include a request for GPS coordinates and/or selected system information signed using a digital signature, which the mobile terminal may beneficially use to further strengthen the protection against a spoofing attack.

15 Claims, 6 Drawing Sheets

(51) Int. Cl.
*H01Q 1/24* (2006.01)
*H04W 4/02* (2018.01)
*H04W 72/04* (2009.01)
*H04W 12/04* (2009.01)
*H04W 88/02* (2009.01)

(52) U.S. Cl.
CPC ....... *H04W 48/20* (2013.01); *H04W 72/0406* (2013.01); *H04W 88/02* (2013.01)

(58) Field of Classification Search
CPC ... H04W 48/02; H04W 48/20; H04W 64/003; H04W 84/045; H04W 84/105; H04W 88/02; H04W 88/08; H01Q 1/243
USPC ....... 455/410–411, 414.1–414.3, 434, 435.1; 726/3, 22; 713/168
See application file for complete search history.

(56) References Cited

U.S. PATENT DOCUMENTS

| | | | |
|---|---|---|---|
| 8,559,636 | B2 | 10/2013 | De Los Reyes |
| 8,667,151 | B2 | 3/2014 | Mizikovsky et al. |
| 8,667,288 | B2 | 3/2014 | Yavuz |
| 8,849,306 | B1 | 9/2014 | McMullen et al. |
| 8,923,815 | B1 | 12/2014 | Zuykov et al. |
| 9,374,709 | B2 | 6/2016 | Peirce et al. |
| 2005/0060576 | A1 | 3/2005 | Kime et al. |
| 2005/0141498 | A1 | 6/2005 | Cam Winget et al. |
| 2007/0106894 | A1* | 5/2007 | Zhang ................ H04L 63/0428 713/170 |
| 2007/0184832 | A1* | 8/2007 | Faccin ................ H04L 63/1458 455/432.1 |
| 2007/0224993 | A1 | 9/2007 | Forsberg |
| 2008/0250498 | A1 | 10/2008 | Butti et al. |
| 2009/0217043 | A1* | 8/2009 | Metke .................. G06F 21/445 713/171 |
| 2010/0100930 | A1 | 4/2010 | King |
| 2010/0165839 | A1 | 7/2010 | Senese et al. |
| 2010/0311411 | A1 | 12/2010 | Lindbom et al. |
| 2011/0151796 | A1* | 6/2011 | Walby ................ B60R 25/2072 455/67.7 |
| 2011/0244902 | A1 | 10/2011 | Kim et al. |
| 2012/0036567 | A1 | 2/2012 | Senese et al. |
| 2012/0100833 | A1 | 4/2012 | Gao |
| 2013/0165077 | A1 | 6/2013 | Aalla et al. |
| 2013/0344844 | A1 | 12/2013 | Goldfarb |
| 2014/0274077 | A1 | 9/2014 | Ramanan et al. |
| 2015/0327303 | A1* | 11/2015 | Akiyoshi .............. H04W 12/06 370/338 |
| 2015/0341176 | A1 | 11/2015 | Staykov et al. |
| 2016/0007176 | A1 | 1/2016 | Moisanen et al. |
| 2017/0295489 | A1* | 10/2017 | Agiwal .................. H04W 4/70 |

OTHER PUBLICATIONS

Dias, Julio S., et al., "Reliable Clock Synchronization for Electronic Documents," Proc. the 3rd IEEE Latin American Network Operations and Management Symposium, Brazil, 2003, pp. 13-20.

"Technical Specification Evolved Universal Terrestrial Radio Access (E-UTRA) and Evolved Universal Terrestrial Radio Access Network (E-UTRAN); Overall description; Stage 2," (3GPP TS 36.300 version 8.9.0 Release 8), ETSI TS 136 300 V8.9.0 (Jul. 2009), pp. 1-162.

"Technical Specification LTE; General Packet Radio Service (GPRS) enhancements for Evolved Universal Terrestrial Radio Access Network (E-UTRAN) access," (3GPP TS 23.401 version 12.6.0 Release 12), ETSI TS 123 401 V12.6.0 (Sep. 2014), pp. 1-307.

"Technical Report 3rd Generation Partnership Project; Technical Specification Group Services and System Aspects; Study on the security aspects of the next generation system (Release 14)," (3GPP TR 33.899 V0.4.0) (Aug. 2016), pp. 1-156.

"Technical Report 3rd Generation Partnership Project; Technical Specification Group Services and System Aspects; Vocabulary for 3GPP Specifications (Release 10)," (3GPP TR 21.905 V10.3.0) (Mar. 2011), pp. 1-64.

"Technical Specification 3rd Generation Partnership Project; Technical Specification Group Radio Access Network; Evolved Universal Terrestrial Radio Access (E-UTRA); User Equipment (UE) procedures in idle mode (Release 8)," 3GPP TS 36.304 V8.2.0 (May 2008), pp. 1-27.

International Search Report and Written Opinion; dated Jan. 10, 2018 for PCT Application No. PCT/US2017/057973.

Do, M. M., "LTE: Tracking Area (TA) and Tracking Area Update (TAU)," As retrieved on Jan. 3, 2018 from: www.netmanias.com/en/post/blog/5930/lte-tau/lte-tracking-area-ta-and-tracking-area-update-tau.

* cited by examiner

100

406

410

VERIFICATION OF CELL AUTHENTICITY IN A WIRELESS NETWORK USING A SYSTEM QUERY

CROSS-REFERENCE TO RELATED APPLICATIONS

This application claims priority from U.S. Provisional Patent Application Ser. No. 62/414,373 filed on 28 Oct. 2016 and entitled "Detecting False Nodes in 5G Networks," which is incorporated herein by reference in its entirety.

BACKGROUND

Field

The present disclosure relates to wireless communications and, more specifically but not exclusively, to verification of cell authenticity in a wireless network.

Description of the Related Art

This section introduces aspects that may help facilitate a better understanding of the disclosure. Accordingly, the statements of this section are to be read in this light and are not to be understood as admissions about what is in the prior art or what is not in the prior art.

In the context of network security, a spoofing attack is a condition in which one device or program successfully masquerades as another by falsifying data, thereby gaining an illegitimate access and/or advantage.

Until recently, wireless-network operators assumed that attackers lacked the expertise and/or resources to build a device that can emulate a base station. Under this assumption, the wireless networks were typically configured to require authentication from the connecting mobile terminal (e.g., a mobile phone), but the connecting mobile terminal was not configured to require authentication from the corresponding base station(s). However, the continued technological development has now rendered the above-indicated assumption obsolete. As a result, practical solutions that can protect a wireless network and its users from a spoofing attack in which an illegitimate entity presents itself as a legitimate base station are being currently developed by the telecom industry.

SUMMARY OF SOME SPECIFIC EMBODIMENTS

Disclosed herein are various embodiments that enable a mobile terminal to authenticate the base station before the mobile terminal proceeds to attach to the corresponding network and/or camp on the corresponding cell, e.g., during the initial network selection and attachment or during an idle mode. In an example embodiment, the authentication processing includes the mobile terminal generating and sending to a candidate base station a system query with a nonce. The candidate base station is deemed to be authentic only if the acknowledgement generated and transmitted in response to the system query includes a copy of the nonce properly signed by a digital signature generated using one or more security keys. In some embodiments, the system query may also include a request for GPS coordinates and/or selected system information signed using a digital signature. The mobile terminal may beneficially use the GPS coordinates and/or selected system information returned with the acknowledgement to strengthen the protection against a spoofing attack afforded by the corresponding authentication processing.

According to an example embodiment, provided is an apparatus comprising: an antenna; a radio-frequency (RF) transceiver operatively coupled to the antenna and configured to wirelessly transmit and receive RF signals via the antenna; and a processor operatively coupled to the RF transceiver and configured to: generate a system query including a first nonce; operate the RF transceiver to transmit a first RF signal having encoded thereon the system query, the first RF signal being directed to a base station; and process an acknowledgement encoded onto a second RF signal received by the RF transceiver in response to the first RF signal to test authenticity of the base station, the test of authenticity being performed using the first nonce.

According to another example embodiment, provided is an apparatus comprising: an antenna; a radio-frequency (RF) transceiver operatively coupled to the antenna and configured to wirelessly transmit and receive RF signals via the antenna; and a processor operatively coupled to the RF transceiver and configured to: generate an acknowledgement in response to a first RF signal received by the RF transceiver from a mobile terminal, the first RF signal having encoded thereon a system query including a nonce, the acknowledgement including a copy of the nonce; and operate the RF transceiver to transmit a second RF signal having encoded thereon the acknowledgement, the second RF signal being directed to the mobile terminal.

According to yet another example embodiment, provided is a method of making a mobile terminal, the method comprising: operatively coupling an antenna to a radio-frequency (RF) transceiver configured to wirelessly transmit and receive RF signals via the antenna; and operatively coupling a processor to the RF transceiver, the processor being configured to: generate a system query including a first nonce; operate the RF transceiver to transmit a first RF signal having encoded thereon the system query, the first RF signal being directed to a base station; and process an acknowledgement encoded onto a second RF signal received by the RF transceiver in response to the first RF signal to test authenticity of the base station, the test of authenticity being performed using the first nonce.

According to yet another example embodiment, provided is a method of making a network node, the method comprising: operatively coupling an antenna to a radio-frequency (RF) transceiver configured to wirelessly transmit and receive RF signals via the antenna; and operatively coupling a processor to the RF transceiver, the processor being configured to: generate an acknowledgement in response to a first RF signal received by the RF transceiver from a mobile terminal, the first RF signal having encoded thereon a system query including a nonce, the acknowledgement including a copy of the nonce; and operate the RF transceiver to transmit a second RF signal having encoded thereon the acknowledgement, the second RF signal being directed to the mobile terminal.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

The following acronyms/abbreviations are used in the description of various embodiments and/or in the accompanying drawings:
3GPP Third Generation Partnership Project;
4G (5G) Fourth Generation (Fifth Generation);
ACK Acknowledgement;
ARQ Automatic Repeat ReQuest;
AS Access Stratum;
CA Certification Authority;
CCF Common Control Function;
CQI Channel Quality Indicator;
DL Downlink;
eNB Evolved Node B;
EPC Evolved Packet Core;
E-UTRAN Evolved UMTS Terrestrial Radio Access Network;
GPS Global Positioning System;
gNB Next Generation (e.g., 4G/5G) Node B;
HARQ Hybrid Automatic Repeat Request;
ID Identifier;
LSB Least Significant Bit;
LTE Long Term Evolution;
MIB Master Information Block;
MME Mobility Management Entity;
MNO Mobile Network Operator;
MSB Most Significant Bit;
NACK Negative Acknowledgement;
NAS Non-Access Stratum;
PDCCH Physical Downlink Control Channel;
PDSCH Physical Downlink Shared Channel;
PHICH Physical Indicator Channel;
PLMN Public Land Mobile Network;
PUCCH Physical Uplink Control Channel;
PUSCH Physical Uplink Shared Channel;
PrK_CA Certification Authority Private Key;
PrK_SS Serving System Private Key;
PuK_CA Certification Authority Public Key;
PuK_SS Serving System Public Key;
RF Radio Frequency;
RRC Radio Resource Control;
RSS Received Signal Strength;
SFN System Frame Number;
SIB System Information Block;
SIG Digital Signature;
SQ System Query;
SQR System Query Response;
SR Scheduling Request;
SS Serving System;
UE User Equipment;
UL Uplink;
UMTS Universal Mobile Telecommunications System; and
UTC Coordinated Universal Time.

Some embodiments disclosed herein may benefit from the use of the methods and apparatus disclosed in (i) U.S. patent application Ser. No. 15/383,725, by Suresh Nair and Semyon Mizikovsky, filed on the same date as the present application, and entitled "VERIFICATION OF CELL AUTHENTICITY IN A WIRELESS NETWORK THROUGH TRAFFIC MONITORING," and (ii) U.S. patent application Ser. No. 15/383,733, by Suresh Nair and Semyon Mizikovsky, filed on the same date as the present application, and entitled "VERIFICATION OF CELL AUTHENTICITY IN A WIRELESS NETWORK USING AN EXTENDED TIME STAMP," both of which are incorporated herein by reference in their entirety.

At least some embodiments disclosed herein can be used, e.g., in wireless networks that comply with one or more standards developed under the auspices of the Third Generation Partnership Project (3GPP). Such embodiments may benefit from the subject matter described in the following 3GPP technical specifications and/or recommendations: (i) 3GPP TR 33.899 V0.4.0 (2016-08); (ii) 3GPP TS 36.304 V8.2.0 (2008-05); (iii) 3GPP TR 21.905 V10.3.0 (2011-03); (iv) 3GPP TS 36.300 V8.9.0 (2009-07); and (v) 3GPP TS 23.401 V12.6.0 (2014-09), all of which are incorporated herein by reference in their entirety.

Figure 1:
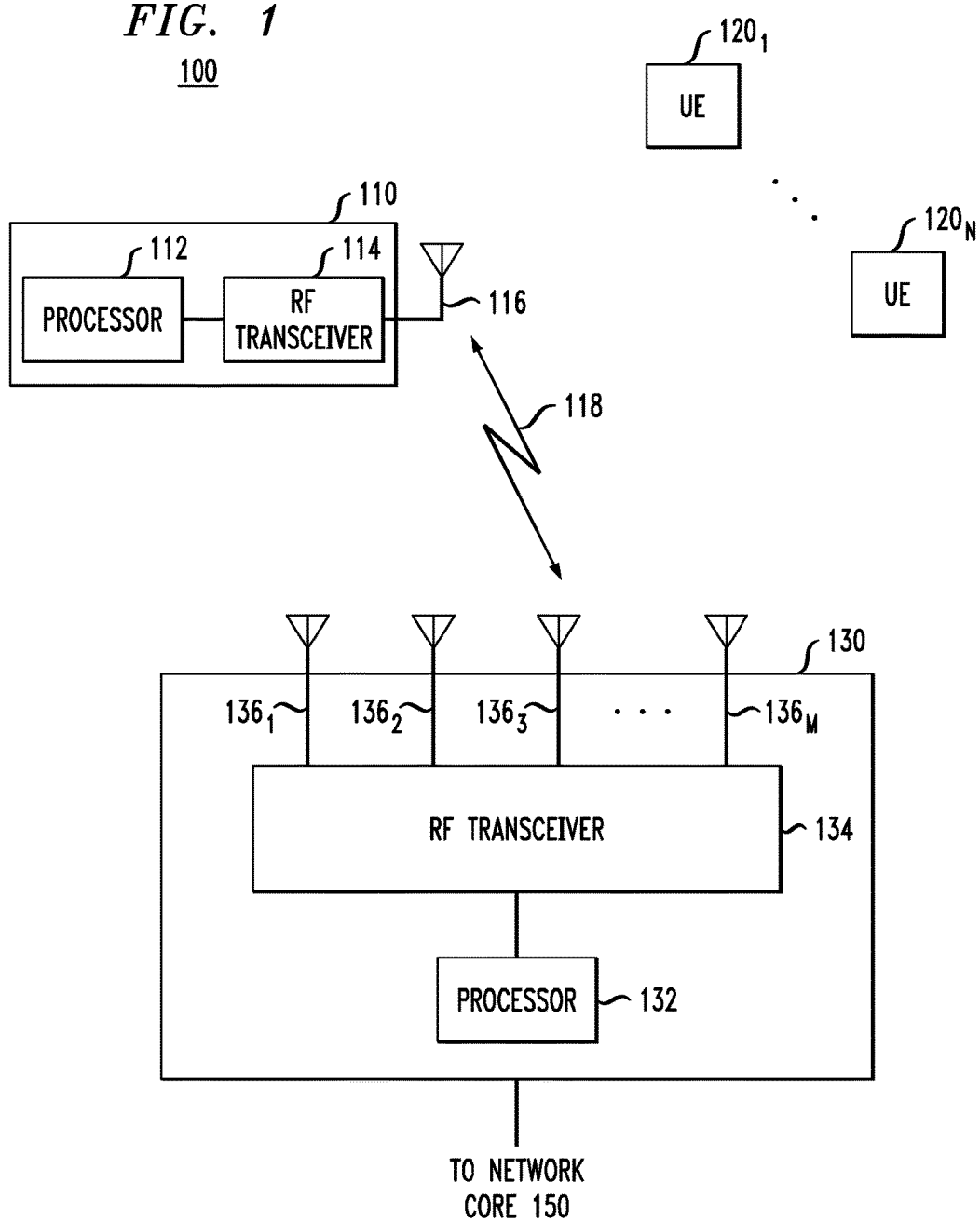
FIG. 1 shows a block diagram of a communication system in which various embodiments can be practiced.

FIG. 1 shows a block diagram of a communication system 100 in which various embodiments can be practiced. System 100 includes a mobile terminal 110, a plurality of mobile terminals $120_1$-$120_N$, and a base station 130 operatively connected to a network core 150. In an example embodiment, base station 130 can be an instance of an evolved Node B (eNB) or a next-generation Node B (gNB). In the context of different generations (e.g., 3G, 4G, and/or 5G) of Long Term Evolution (LTE) networks, a mobile terminal, such as any of mobile terminals 110 and $120_1$-$120_N$, may be referred to as user equipment (UE), and network core 150 may be referred to as the evolved packet core (EPC). Base station 130 may be a part of an evolved UMTS terrestrial radio access network (E-UTRAN) that has additional base stations (not explicitly shown in FIG. 1) operatively connected to base station 130 and network core 150 as known in the pertinent art.

In an example embodiment, mobile terminal 110 comprises a processor 112 interfaced to a radio-frequency (RF) transceiver 114 that is connected to one or more antennas 116 in a manner that enables the mobile terminal to establish and maintain a wireless link 118 with base station 130. In operation, wireless link 118 enables mobile terminal 110 to send uplink (UL) signals to base station 130 and receive downlink (DL) signals from the base station, e.g., to support and carry a phone call or a data session. Each of mobile terminals $120_1$-$120_N$ can be functionally and/or structurally similar to mobile terminal 110. In some embodiments, mobile terminals $120_1$-$120_N$ may not be present. In various embodiments, mobile terminal 110 can be a cellular telephone, a smartphone, a handheld computer, a personal media device, etc.

In an example embodiment, base station 130 comprises a processor 132 interfaced to an RF transceiver 134 that is connected to a plurality of antennas $136_1$-$136_M$ in a manner that enables the base station to establish and support wireless link 118 and/or one or more other wireless links (not explicitly shown in FIG. 1) with mobile terminals $120_1$-$120_N$. For example, base station 130 may broadcast data that enable mobile terminal 110 to first select the cell served by the base station to be the serving cell and then establish wireless link 118. The broadcast data may include but are not limited to a master information block (MIB) and a system information block (SIB) that can carry information regarding the PLMN operator, cell ID, frequency, broadcast periodicity, tracking area code, etc. When in an idle mode, mobile terminal 110 may rely on the broadcast data to find a suitable cell to camp on, e.g., based on the received signal strength (RSS), PLMN operator, and other relevant parameters.

As used herein, the term "idle mode" refers to a mode of operation in which a mobile terminal, such as mobile terminal 110, can perform PLMN selection, cell selection and reselection, and optional location registration, e.g., as described in Section 4 of the above-cited 3GPP TS 36.304 document. For example, when the mobile terminal is switched on, it proceeds to select a PLMN based on the preset criteria. After the PLMN is selected, the mobile terminal searches for a suitable cell of the selected PLMN, selects a suitable or acceptable cell, and tunes to the cell's control channel. The latter process is sometimes referred to as "camping on the cell." If appropriate or necessary, the mobile terminal may register its presence, e.g., using a NAS registration procedure, in the tracking area of the selected cell. If the mobile terminal later finds a more-suitable cell, according to the preset cell reselection criteria, then the mobile terminal may reselect the cell and camp on the newly selected cell.

The camping on a cell in an idle mode enables the mobile terminal to do one or more of the following:
 (i) to receive system information from the PLMN;
 (ii) if the mobile terminal wishes to establish an RRC connection, then it can do so by initially accessing the network on the control channel of the cell on which it is camped; and
 (iii) if the PLMN receives a call for the registered mobile terminal, then the PLMN can send a paging message for the mobile terminal on control channels of one or more cells in the tracking area. The mobile terminal will be able to receive this paging message because it is tuned to the control channel of the corresponding cell and can then respond on that control channel.

In a conventional communication system, a rogue entity may be able to mount a spoofing attack, e.g., by re-broadcasting the information that an authentic base station (such as base station 130) has previously broadcasted, while providing a greater RSS for the mobile terminal. Due to the greater RSS, the mobile terminal may select a fake base station and be consequently denied some or all of the above-indicated services that it could have otherwise received in the idle mode.

Various embodiments disclosed herein address at least some of the above-indicated problems in the state of art by providing methods and apparatus that can advantageously be used to test and verify the authenticity of the cell before the mobile terminal decides to camp on it. As a result, mobile terminals may be protected from the above-outlined and possibly other spoofing attacks and/or the associated adverse consequences thereof.

Figure 2:
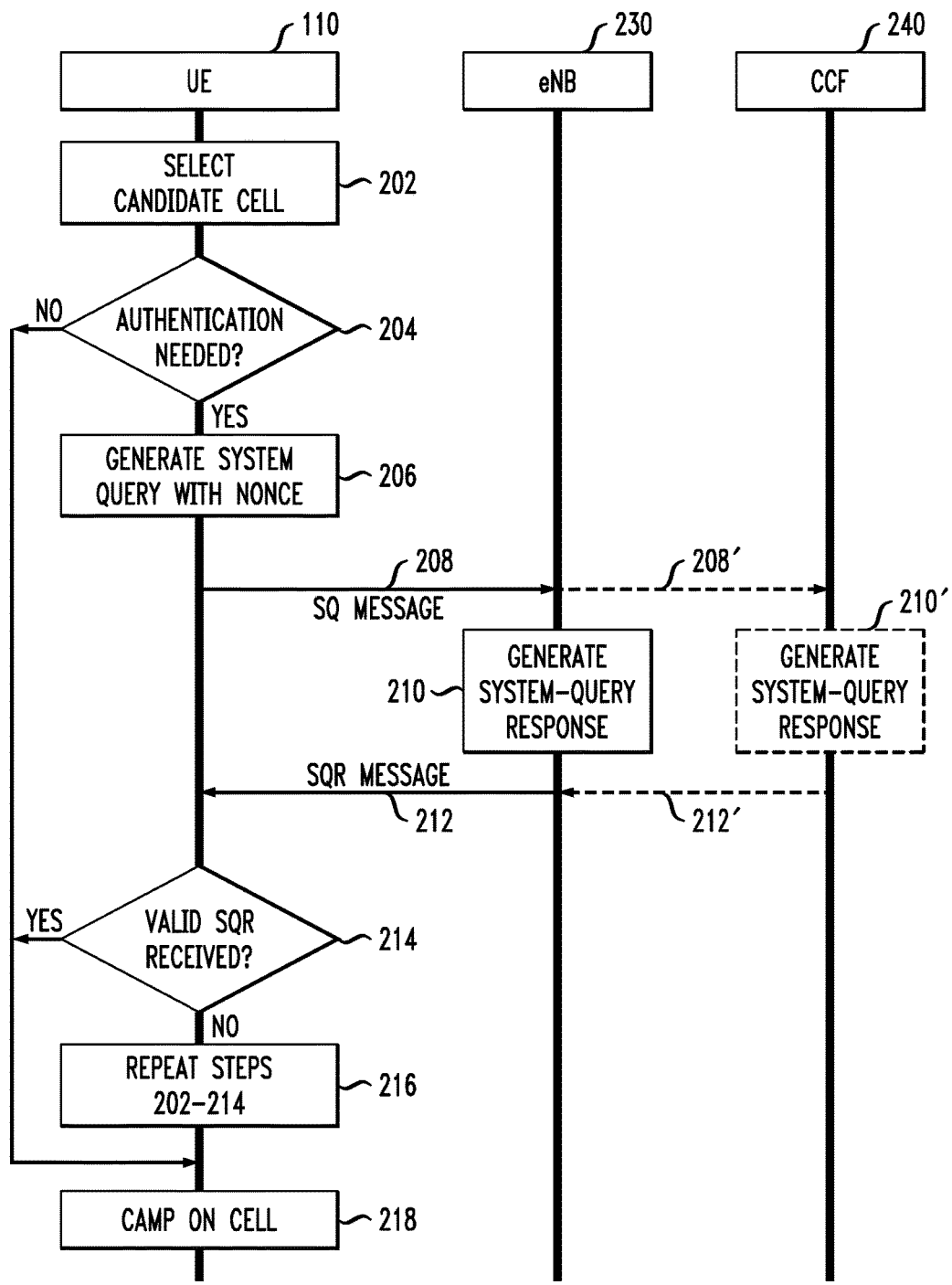
FIG. 2 shows a flowchart of a communication method that can be used in the communication system of FIG. 1 according to an embodiment.

FIG. 2 shows a flowchart of a communication method 200 that can be used in system 100 according to an embodiment. For illustration purposes and without any implied limitations, method 200 is described in reference to mobile terminal 110 and a candidate base station 230. Depending on the circumstances, candidate base station 230 can be a legitimate base station, such as base station 130 (see FIG. 1), or a fake base station configured to attempt a spoofing attack. A person of ordinary skill in the art will understand that embodiments of method 200 can similarly be used by some or all of mobile terminals 120.

In some embodiments, communication method 200 optionally includes communications with and actions by an electronic controller 240 that may be responsible for executing the corresponding portion of the common control function (CCF) of the corresponding network. Controller 240 typically resides in the control plane of the network core and, as such, can be accessed by a legitimate base station through a corresponding network connection (see, e.g., FIG. 1). Some embodiments of controller 240 can be implemented using a mobility management entity (MME) of an LTE network. A set of functions supported by the MME may include but are not limited to: (i) functions related to bearer management, such as the establishment, maintenance, and release of the bearers within the session-management layer of the NAS protocol, and (ii) functions related to connection management, such as the establishment of the connection and security between the network and UE within the connection- or mobility-management layer of the NAS protocol (see, e.g., the above-cited 3GPP TS 23.401 document). Based on the provided description, a person of ordinary skill in the art will understand how to make appropriate modifications to the functions supported by a conventional MME to arrive at an MME that is compatible with and is able to support method 200.

The vertical lines that extend down in FIG. 2 from each of the blocks depicting mobile terminal 110, base station 230, and controller 240 represent the increasing time. Each of the horizontal arrows that connect the time lines represents a respective control message transmitted between the participants using the corresponding RF signal. The direction of the arrow indicates the transmission direction for the control message.

Embodiments of method 200 can beneficially be used to enable mobile terminal 110 to test and verify the authenticity of a cell before the mobile terminal decides to camp on it. As such, embodiments of method 200 can be incorporated into the cell selection/reselection processes executed during an idle mode and/or during an initial network discovery and selection subsequent to the power-on of the mobile terminal. In an example embodiment, mobile terminal 110 will camp on a cell only if it receives a valid response to a system query (SQ), e.g., as described in more detail below. If mobile terminal 110 does not receive a valid response within a fixed allocated time or if the received response is determined to be invalid, then the mobile terminal may disqualify the queried cell and continue its search for a suitable or acceptable cell to camp on.

At step 202 of method 200, mobile terminal 110 selects a candidate cell that it can potentially camp on if base station 230 that serves the candidate cell is verified to be authentic. In an example embodiment, step 202 may include receiving and analyzing one or more MIBs and/or SIBs broadcast by the one or more base stations located in the vicinity of mobile terminal 110. The performed analysis may include (i) determining the respective RSS, PLMN, tracking area, etc., corresponding to the one or more base stations and (ii) applying the preset cell selection/reselection criteria to identify within the set of the one or more base stations a potential candidate base station and then select the candidate base station for further authentication processing using the subsequent steps of method 200.

At step 204, mobile terminal 110 determines whether or not cell authentication is needed. In general, mobile terminal 110 is unable to conclusively determine the authenticity of the cell solely based on the MIBs and SIBs received at step 202 due to the possible replay of the same by a fake base station. However, in some situations, the candidate cell selected at step 202 can be deemed trustworthy for some other reasons. For example, the corresponding base station 230 may have been authenticated relatively recently. In such situations, steps 206-216 are bypassed, and the processing of method 200 is directed to step 218. Otherwise, the processing of method 200 is directed to step 206.

At step 206, mobile terminal 110 generates a system query (SQ) with a nonce. A control message 208 carrying this system query is transmitted to base station 230 of the candidate cell identified at step 202.

In some embodiments, the system query generated at step 206 may include a request for additional system information and/or a signed copy of selected system information that can be then analyzed and/or independently verified by mobile terminal 110 in a trusted manner. An example of such additional system information may be the GPS coordinates of base station 230. In some embodiments, the requested signed system information may include some or all of: (i) the entirety of the MIB and/or SIB information broadcasted by base station 230; (ii) some specific system-information elements, such as the cell ID, PLMN operator ID, and current UTC time; and (iii) indication of support (or non-support) of certain specific features, such as voice call, selected broadcast services, access to network slicing at the core-network elements and/or within the base station, ultra-low-latency bearers, etc., with the digital signature that signs the returned requested system information being generated in a manner that enables appropriate verification thereof at mobile terminal 110.

At step 210, if base station 230 is a legitimate base station 130, then the base station is able to generate a proper system-query response (SQR) after receiving control message 208. In an example embodiment, the generated SQR can contain some or all of the following elements:
(i) the cell ID or CCF ID;
(ii) a copy of the nonce received via control message 208;
(iii) the serving-system public key (PuK_SS) and its digital signature (SIG1) computed by the trusted certification authority (CA) using its private key (PrK_CA) and provided in advance to base station 130: [PuK_SS][SIG1(PuK_SS)PrK_CA];
(iv) the digital signature (SIG2) of elements (i)-(iii) computed using the serving-system private key (PrK_SS):
{SIG2 [Cell_ID/CCF_ID], [NONCE], [PuK_SS][SIG1 (PuK_SS)PrK_CA]}$_{PrK\_SS}$.

The key PrK_SS is typically provided to the serving system by way of provisioning, and only legitimate network elements owned by the PLMN operator normally have the proper key PrK_SS provisioned to them. In some embodiments, the generated SQR may contain the GPS coordinates of base station 130 if they were requested at step 206/208. A control message 212 carrying the SQR generated at step 210 is then transmitted back to mobile terminal 110.

If base station 230 is a fake base station, then the base station is not going to be able to: (i) properly perform step 210, (ii) generate a proper SQR bearing the expected digital signature of the serving system that can be verified by the UE, and (iii) transmit a proper control message 212.

For example, a fake base may not be capable of generating the SQR as indicated above, e.g., because the fake base station is unlikely to have all of the required keys.

As another example, the GPS coordinates provided by a fake base station are likely to be inconsistent with the current GPS coordinates of mobile terminal 110 because the fake base station typically replays the signals of a legitimate base station even if the fake base station is located outside the radio range thereof. Consequently, mobile terminal 110 may be able to detect a corresponding inconsistency at step 214, e.g., by using the received GPS coordinates to (i) compute the alleged distance to the base station and/or (ii) compare the actual RSS with an estimated RSS corresponding to the computed distance. For example, the received SQR can be deemed invalid due to the inconsistent GPS coordinates (i) if the computed distance is greater than a fixed threshold distance, e.g., representing the typical radio range of a legitimate base station in the given network, and/or (ii) if the actual RSS exceeds the estimated RSS by a fixed threshold value, with the estimated RSS being a typical RSS of a legitimate base station expected at the computed distance.

In some embodiments, the execution of step 210 can be delegated to controller 240 residing in network core 150. In such embodiments, a legitimate base station 130 first operates to relay control message 208 to controller 240. The relayed control message 208 is shown in FIG. 2 as control message 208'. Controller 240 then executes step 210, e.g., as described above. The instance of step 210 performed at controller 240 is shown in FIG. 2 as step 210'. A control message 212' carrying the SQR generated at step 210' is then transmitted back to legitimate base station 130 and relayed to mobile terminal 110 as control message 212.

If base station 230 is a fake base station, then the base station is likely unable to connect with controller 240. As a result, controller 240 does not receive control message 208', does not execute step 210', and does not transmit control message 212'. The end result of the latter is that mobile terminal 110 does not receive control message 212.

At step 214, mobile terminal 110 determines whether or not a valid SQR has been received in response to control message 208. If the SQR received by way of control message 212 is determined to be invalid or if control message 212 is not received within a predetermined fixed time after the transmission of control message 208, then the processing of method 200 is directed to step 216. Otherwise, the processing of method 200 is directed to step 218.

In an example embodiment, the validity of the SQR received by way of control message 212 (if any) can be determined at step 214 using the following validation sub-steps.

At a first validation sub-step of step 214, mobile terminal 110 uses the pre-provisioned public key of the trusted certification authority (PuK_CA) to validate the digital signature SIG1 of the received SQR. Once SIG1 is validated, mobile terminal 110 accepts the serving-system public key (PuK_SS) contained in the SQR as a trusted security key.

At a second validation sub-step of step 214, mobile terminal 110 verifies that the nonce contained in the received SQR matches the nonce of control message 208. This verification can be accomplished by simply comparing the two nonces.

At a third validation sub-step of step 214, mobile terminal 110 uses the serving-system public key PuK_SS accepted at the first validation sub-step to validate the digital signature SIG2 of the received SQR. Once the digital signature SIG2 is validated, the received SQR is deemed to be a valid SQR.

If any of the above-indicated validation sub-steps breaks down or produces an error, the received SQR is deemed to be an invalid SQR.

In some embodiments, step 214 may include one or more additional validation sub-steps, e.g., as indicated above in reference to the embodiment designed to use GPS coordinates in the validation process.

At step 216, mobile terminal 110 proceeds to repeat steps 202-214. Prior to repeating step 202, mobile terminal 110 may disqualify the corresponding base station 230 and remove it from further consideration. Such disqualification may take effect, e.g., after the corresponding base station 230 fails to return a valid SQR a pre-determined fixed number of times. In some embodiments, this fixed number can be as low as one. Depending on the outcome of the repeated step 214, step 216 may include more than one repeat of steps 202-214.

At step 218, mobile terminal 110 proceeds to camp on the cell served by the corresponding base station 230.

Without limitation, some advantages and/or benefits that may be provided by an embodiment of method 200 include:
(i) the corresponding authenticity-verification procedure is relatively short and includes only one "roundtrip" control message, e.g., 208/212;
(ii) there is no state change for the UE, as it remains in the idle mode throughout the corresponding authenticity-verification procedure;
(iii) spoofing attacks that use digital-signature replays can be thwarted due to the use of the nonce;
(iv) there is no significant additional load on the limited air interface used for the transmission of SIBs;
(v) the idle-mode cell (re)selection can potentially be customized and/or optimized using embodiments of the above-described SQ/SQR procedure, e.g., by configuring the eNB to send a SIB with the required system information only if requested by the UE; and
(vi) some embodiments of method 200 can be used at the initial network discovery and selection process(es), e.g., to verify the authenticity of a base station and request specific system or service information with a verifiable digital signature.

Figure 3:
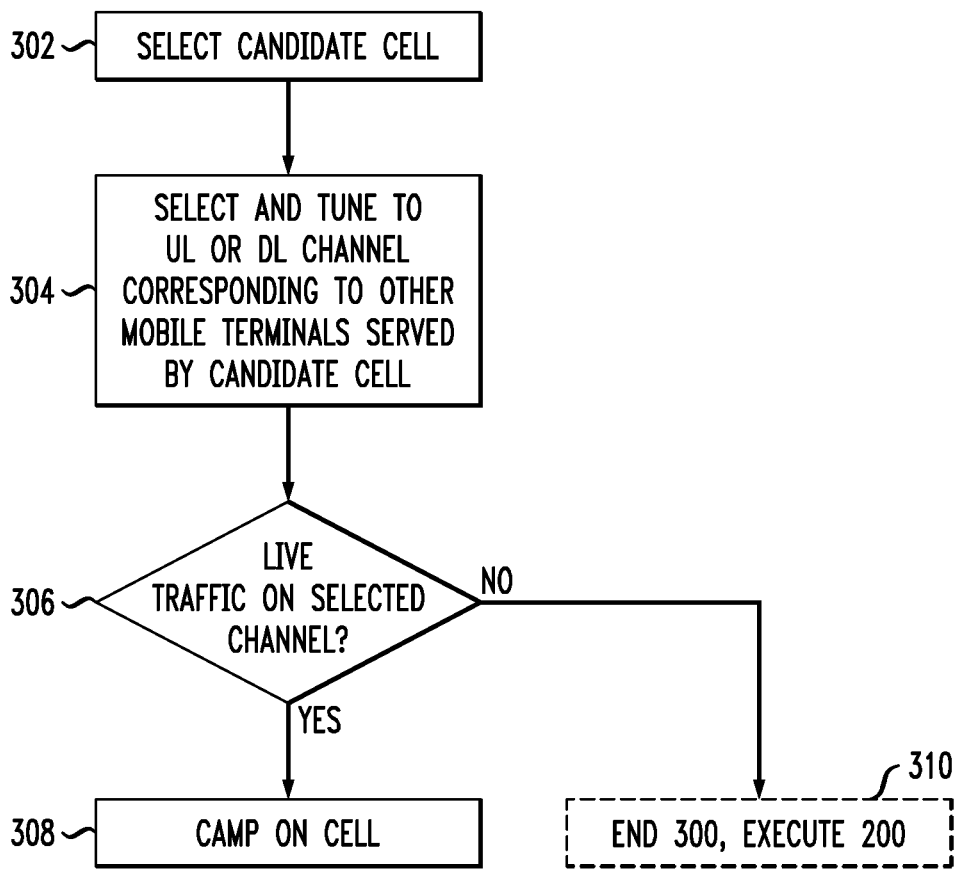
FIG. 3 shows a flowchart of a communication method that can be used in the communication system of FIG. 1 according to another embodiment.

FIG. 3 shows a flowchart of a communication method 300 that can be used in system 100 according to an alternative embodiment. For illustration purposes and without any implied limitations, method 300 is described in reference to mobile terminal 110 and a candidate base station 230 (see FIG. 2). A person of ordinary skill in the art will understand that embodiments of method 300 can similarly be used by some or all of mobile terminals 120.

Embodiments of method 300 can beneficially be used to enable mobile terminal 110 to test and verify the authenticity of a cell before the mobile terminal decides to camp on it. As such, embodiments of method 300 can be incorporated into the cell selection/reselection processes executed during an idle mode.

At step 302 of method 300, mobile terminal 110 selects a candidate cell that it can potentially camp on if the corresponding base station 230 is verified to be authentic. In an example embodiment, step 302 may be similar to step 202 of method 200 (FIG. 2).

At step 304, mobile terminal 110 selects and tunes to an UL or DL channel on which one or more mobile terminals 120 (see FIG. 1) are expected to communicate with base station 230. In various embodiments, the UL/DL channel to which mobile terminal 110 tunes to during step 304 can be: (i) the physical uplink control channel (PUCCH); (ii) the physical uplink shared channel (PUSCH); (iii) the physical downlink control channel (PDCCH); (iv) the physical downlink shared channel (PUSCH); or (v) any other suitable channel described in the above-cited 3GPP TS 36.300 document.

For illustration purposes and without any implied limitation, the description that follows is given in reference to the PUCCH channel. Based on the provided description, a person of ordinary skill in the art will understand how to arrive at an alternative embodiment of method 300 in which a different channel is selected at step 304.

At step 306, mobile terminal 110 monitors the UL or DL channel selected at step 304 to determine whether or not that channel carries live traffic corresponding to one or more mobile terminals 120. If mobile terminal 110 detects such live traffic within a fixed duration of time, then the processing of method 300 is directed to step 308. Otherwise, the processing of method 300 is directed to step 310.

For example, a legitimate PUCCH channel is expected to carry one or more of the following: (i) a hybrid ARQ ACK or NACK in response to a downlink transmission; (ii) a scheduling request (SR); and (iii) a CQI report. The presence of one or more of these transmissions from one or more mobile terminals 120 on the PUCCH channel can therefore be interpreted by mobile terminal 110 as a reliable indicator that base station 230 is an authentic base station. In general, a fake base station 230 is not expected to be capable of mimicking the UL traffic from mobile terminals 120 on the PUCCH channel. On the other hand, if base station 230 is serving mobile terminals 120 on the downlink, then the served mobile terminals are expected to send the corresponding SRs, ARQ ACK/NACKs, and/or CQI reports on the PUCCH channel. Thus, if mobile terminal 110 detects live UL traffic on the PUCCH channel, then such traffic can be used as a reliable indicator that base station 230 is communicating with and serving other mobile terminals and, as such, is likely to be authentic.

However, the absence of transmissions on the PUCCH channel might be inconclusive, e.g., due to (relatively infrequent) situations in which no mobile terminals 120 are present within the cell at the time when method 300 is executed. Such situations may arise, e.g., during late-night or early-morning hours when the traffic volume in the corresponding communication system can be relatively low. As a result, an alternative authentication method, such as method 200, might need to be used during those hours.

At step 308, mobile terminal 110 proceeds to camp on the cell anchored by the corresponding base station 230.

At step 310, mobile terminal 110 exits method 300 and, optionally, proceeds to execute a suitable embodiment of method 200.

Some advantages and/or benefits that may be provided by an embodiment of method 300 may be similar to those indicated above in reference to method 200.

Figure 4:
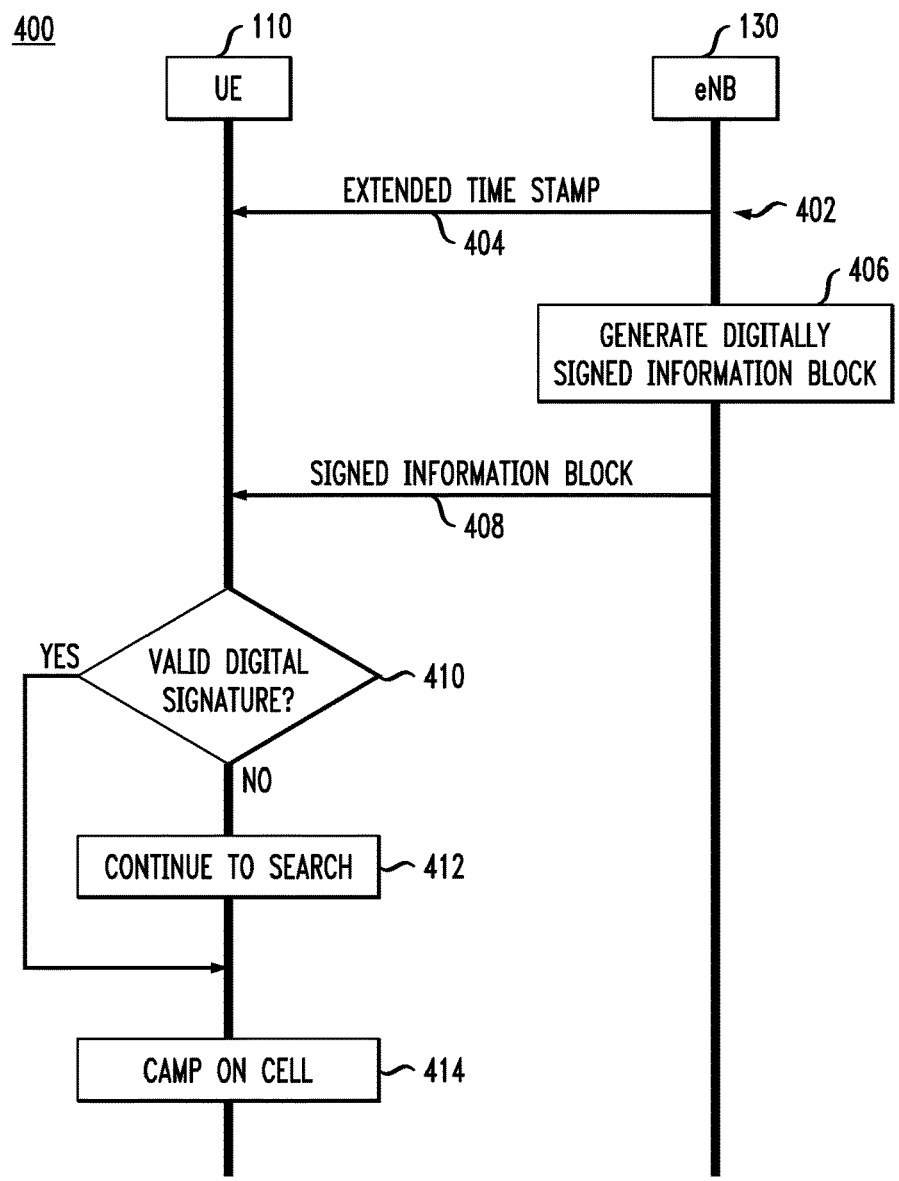
FIG. 4 shows a flowchart of a communication method that can be used in the communication system of FIG. 1 according to yet another embodiment.

FIG. 4 shows a flowchart of a communication method 400 that can be used in system 100 according to yet another embodiment. Method 400 is depicted in FIG. 4 in a manner similar to that used for the depiction of method 200 in FIG. 2. For illustration purposes and without any implied limitations, method 400 is described in reference to mobile terminal 110 and base station 130 (FIG. 1). A person of ordinary skill in the art will understand that embodiments of method 400 can similarly be used by at least some mobile terminals 120. Similar to methods 200 and 300, method 400 can be carried out while mobile terminal 110 is in an idle mode.

Method 400 is generally designed to thwart replay attacks by a fake base station in which the fake base station records and replays system messages, such as MIBs and SIBs, transmitted by base station 130 and then matches (e.g., extrapolates) the parameters of the time stamp used therein to generate a time stamp for the messages transmitted in a malicious broadcast. Embodiments of method 400 address this problem as further described below in reference to FIGS. 4-7.

In an example embodiment, method 400 includes a transmission step 402 in which base station 130 broadcasts a message 404 that carries an extended time stamp, e.g., without encryption. Step 402 can be repeated, e.g., periodically, randomly, or as needed.

As used herein, the term "extended time stamp" refers to a time stamp that has one or more time-counter fields in addition to the time-counter fields of a conventional UTC time stamp. A conventional UTC time stamp is a 24-hour time stamp that indicates the pertinent time using the following time-counter fields: (i) a millisecond field; (ii) a second field; (iii) a minute field; and (iv) an hour field. The additional field(s) that "extend(s)" the UTC time stamp may include one or more of: (v) a day field; (vi) a month field; and (vii) a year field, e.g., as described in reference to FIG. 5.

Figure 5:
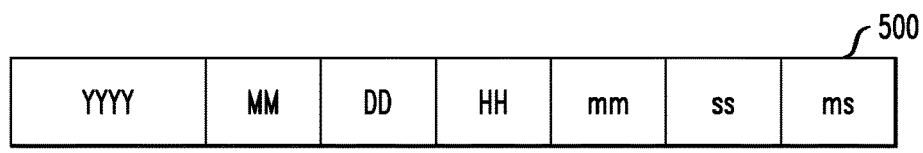
FIG. 5 shows an example format of an extended time stamp that can be used in the communication system of FIG. 1 according to an embodiment.

FIG. 5 shows an example format of an extended time stamp 500 that can be used in method 400 according to an embodiment. Time stamp 500 includes seven time-counter fields, wherein the ms field shows milliseconds; the ss field shows seconds; the mm field shows minutes; the HH field shows the hour of the day; the DD field indicates the day of the month; the MM field indicates the month of the year; and the YYYY field indicates the calendar year. The ms field carries the corresponding least-significant bits (LSBs) of time stamp 500. The YYYY field carries the corresponding most-significant bits (MSBs) of time stamp 500. The length (in bits) of each time-counter field can be selected as appropriate or necessary for a particular embodiment.

For example, the length of the YYYY field can be one bit to indicate that the calendar year is even or odd. In this case, extended time stamp 500 is characterized by a periodicity of two years, and its time-counter values will repeat every two years. Alternatively, the length of the YYYY field can be two bits to indicate the calendar year in (mod 4). Under this alternative, extended time stamp 500 is characterized by a periodicity of four years, and its time-counter values will repeat every four years. In yet another alternative, the length of the YYYY field can be three bits to indicate the calendar year in (mod 8). Under the latter alternative, extended time stamp 500 is characterized by a periodicity of eight years, and its time-counter values will repeat every eight years, and so on.

Referring back to FIG. 4, at step 406, base station 130 generates an information block, e.g., a MIB or a SIB, using an extended time stamp having the same format as that used in message 404. Base station 130 then broadcasts the generated information block using a message 408.

Figure 6:
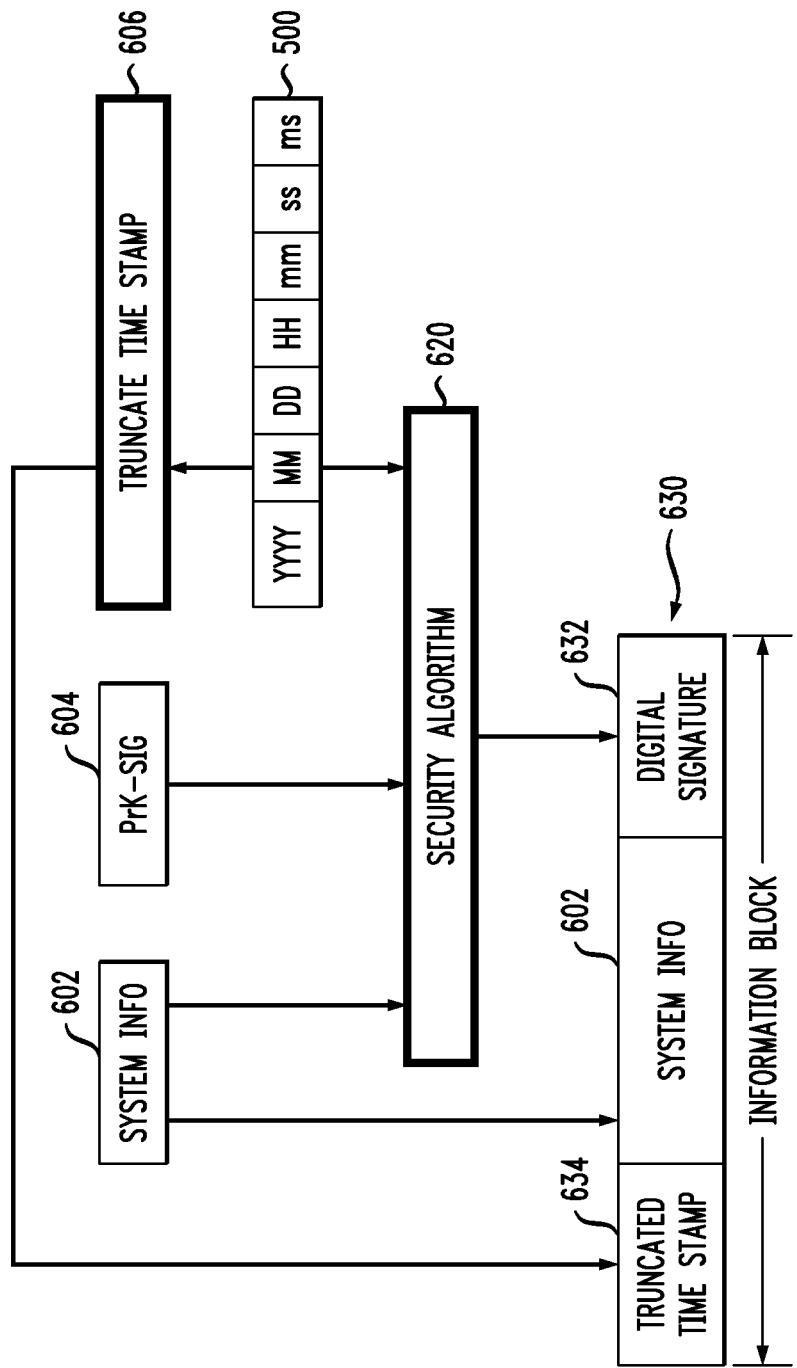
FIG. 6 shows a flowchart of a processing step that can be used in the communication method of FIG. 4 according to an embodiment.

FIG. 6 shows a flowchart of step 406 according to an embodiment. In an example embodiment, base station 130 uses a security algorithm 620 to generate a digital signature 632 for an information block 630 to be transmitted by way of message 408 (FIG. 4). Information block 630 further comprises a system-information sub-block 602 and a truncated time stamp 634.

Security algorithm 620 (e.g., run using processor 132, FIG. 1) operates to generate digital signature 632 based on input data that include system-information sub-block 602, a private security key (PrK-SIG) 604, and extended time stamp 500. Due to the use of extended time stamp 500, digital signature 632 does not repeat itself at least until the corresponding time-counter value carried by extended time stamp 500 is repeated. As already indicated above, the periodicity of extended time stamp 500 is at least two years. For all practical purposes, this length of time is too long for a fake base station to mount a replay attack, e.g., because the fake base station would have to record at least two years worth of digital signatures 632 before it can replay an appropriate one of them in a malicious broadcast.

The contents of system-information sub-block 602 depend on the type of information block 630. For example, if information block 630 is a MIB, then system-information sub-block 602 may include some or all of the following information/parameters: (i) the system bandwidth; (ii) the SFN; and (iii) the PHICH HARQ configuration. If information block 630 is a SIB, then system-information sub-block 602 may include some or all of the following information/parameters: (i) the PLMN identity; (ii) indication of whether or not the cell is reserved for operator use; (iii) the tracking area code; (iv) the cell ID; (v) indication of whether or not the cell is cell barred; (vi) intra frequency reselection; (vii) cell selection information, (viii) the receiver configuration; (ix) the maximum power; (x) the frequency-band indicator; (xi) scheduling information; etc.

The private key PrK-SIG 604 is typically specific to the tracking area and may be provisioned to base station 130 by the corresponding mobile network operator (MNO). A public security key (PuK-SIG) 704 (see FIG. 7) corresponding to the private key PrK-SIG 604 may be provisioned by core network 150 to mobile terminal 110 when performing a location update procedure.

The time-counter value provided by extended time stamp 500 to security algorithm 620 is the value of the time counter corresponding to the time slot in which message 408 carrying information block 630 is transmitted.

Truncated time stamp 634 is generated by base station 130 using a processing sub-step 606 that includes truncating the time-counter value of extended time stamp 500 to remove therefrom a predetermined fixed number of MSBs and, optionally, a predetermined fixed number of LSBs. In an example embodiment, sub-step 606 includes removing the YYYY, MM, and DD fields of extended time stamp 500 to cause truncated time stamp 634 to carry the UTC time. In some embodiments, sub-step 606 may also include removing the ms field of extended time stamp 500. In some other embodiments, sub-step 606 may further include removing the ss field of extended time stamp 500.

Referring back to FIG. 4, at step 410, mobile terminal 110 determines whether or not the digital signature 632 included in the received message 408 is valid. If the digital signature 632 is determined to be invalid, then the processing of method 400 is directed to step 412. Otherwise, the processing of method 400 is directed to step 414.

Figure 7:
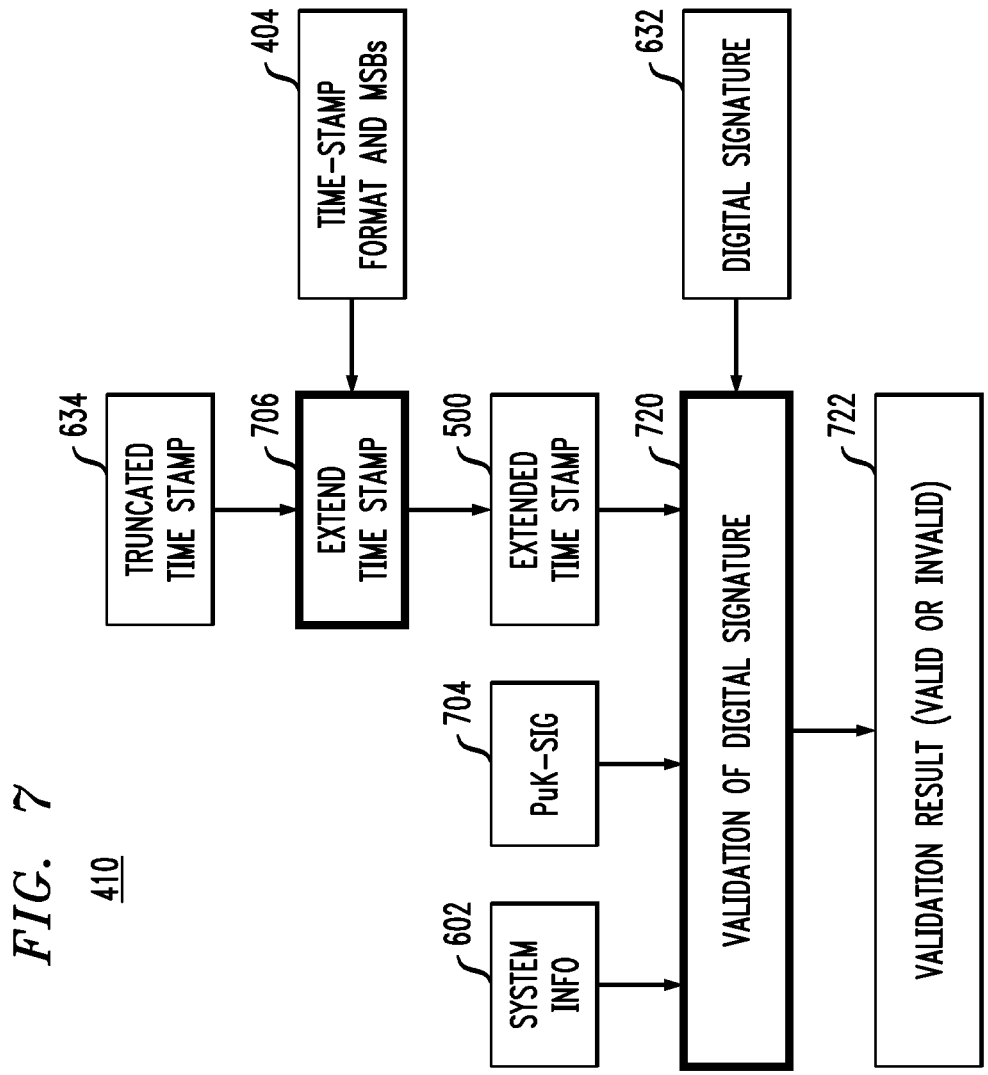
FIG. 7 shows a flowchart of another processing step that can be used in the communication method of FIG. 4 according to an embodiment.

FIG. 7 shows a flowchart of step 410 according to an embodiment. In an example embodiment, step 410 comprises sub-steps 706 and 720.

Sub-step 706 carries out an operation that is substantially inverse to that of sub-step 606 of step 406 to recreate the original extended time stamp 500 used by base station 130 at step 406 (also see FIG. 6). In an example embodiment, sub-step 706 operates to extend the truncated time stamp 634 included in the received message 408 by first adding extra time-counter fields in accordance with the time-stamp format that was previously communicated to mobile terminal 110 by way of message 404 (FIG. 4), and then writing appropriate binary values into those extra time-counter fields. The binary values for the extra time-counter fields can be obtained, e.g., from the latest message 404, provided that the latest message 404 is not too old. Alternatively, message(s) 404 can be used to synchronize the year/month/day portion of the internal clock of mobile terminal 110 with that of base station 130 and then use the synchronized internal clock to properly fill in the extra time-counter fields.

Sub-step 720 comprises executing a signature-validation algorithm corresponding to security algorithm 620 used at step 406. In an example embodiment, the signature-validation algorithm of sub-step 720 receives as inputs: (i) the system-information sub-block 602 included in the received message 408; (ii) the above-mentioned public key PuK-SIG 704; (iii) the extended time stamp 500 recreated at sub-step 706 as described above; and (iv) the digital signature 632 included in the received message 408. A person of ordinary skill in the art will understand that these inputs are sufficient for the signature-validation algorithm of sub-step 720 to conclusively determine whether or not the digital signature 632 is valid. A result 722 (valid or invalid) generated by the signature-validation algorithm of sub-step 720 based on the above-indicated inputs can then be used to appropriately direct the processing of method 400 to step 412 or step 414.

Referring back to FIG. 4, at step 412, mobile terminal 110 continues its search for a base station to camp on. In an example embodiment, step 412 may include waiting for next messages 404 and 408 to arrive, possibly from a different base station, and then re-executing step 410.

At step 414, mobile terminal 110 proceeds to camp on the cell corresponding to the base station 130 from which messages 404 and 408 were received.

According to an example embodiment disclosed above in reference to FIGS. 1-7, provided is an apparatus comprising: an antenna (e.g., 116, FIG. 1); a radio-frequency (RF) transceiver (e.g., 114, FIG. 1) operatively coupled to the antenna and configured to wirelessly transmit and receive RF signals via the antenna; and a processor (e.g., 112, FIG. 1) operatively coupled to the RF transceiver and configured to: generate (e.g., at 206, FIG. 2) a system query including a first nonce; operate the RF transceiver to transmit a first RF signal (e.g., 208, FIG. 2) having encoded thereon the system query, the first RF signal being directed to a base station (e.g., 230, FIG. 2); and process an acknowledgement encoded onto a second RF signal (e.g., 212, FIG. 2) received by the RF transceiver in response to the first RF signal to test authenticity of the base station, the test of authenticity being performed using the first nonce.

In some embodiments of the above apparatus, the processor is further configured to: determine validity of a first digital signature (e.g., SIG1) included in the acknowledgement using a first security key (e.g., PuK_CA); and compare a second nonce and the first nonce, the second nonce being a nonce included in the acknowledgement.

In some embodiments of any of the above apparatus, the processor is further configured to determine validity of a second digital signature (e.g., SIG2) included in the acknowledgement using a second security key (e.g., PuK_SS).

In some embodiments of any of the above apparatus, the second security key is included in the acknowledgement.

In some embodiments of any of the above apparatus, the processor is further configured to cause the system query to comprise a request to include in the acknowledgement one or more of the following: (i) a set of GPS coordinates; (ii) selected system information signed using a verifiable digital signature; and (iii) indication of support or non-support for one or more of selected operational features signed using a verifiable digital signature.

In some embodiments of any of the above apparatus, the processor is further configured to: read a set of GPS coordinates included in the acknowledgement; and test authenticity of the base station using the set of GPS coordinates.

In some embodiments of any of the above apparatus, the processor is further configured to: read at least one of (i) selected system information and (ii) indication of support or non-support for one or more of selected operational features included in the acknowledgement, the selected system information and the indication having been signed using a digital signature; and test authenticity of the base station using the digital signature.

In some embodiments of any of the above apparatus, the antenna, the RF transceiver, and the processor are parts of a mobile terminal (e.g., 110, FIG. 1).

In some embodiments of any of the above apparatus, the mobile terminal is configured to camp (e.g., 218, FIG. 2) on a cell corresponding to the base station in response to the test of authenticity confirming the authenticity of the base station.

According to another example embodiment disclosed above in reference to FIGS. 1-7, provided is an apparatus comprising: an antenna (e.g., 136, FIG. 1); a radio-frequency (RF) transceiver (e.g., 134, FIG. 1) operatively coupled to the antenna and configured to wirelessly transmit and receive RF signals via the antenna; and a processor (e.g., 132 or CCF, FIG. 1) operatively coupled to the RF transceiver and configured to: generate (e.g., at 210, FIG. 2) an acknowledgement in response to a first RF signal (e.g., 208, FIG. 2) received by the RF transceiver from a mobile terminal (e.g., 110, FIG. 1), the first RF signal having encoded thereon a system query including a nonce, the acknowledgement including a copy of the nonce; and operate the RF transceiver to transmit a second RF signal (e.g., 212, FIG. 2) having encoded thereon the acknowledgement, the second RF signal being directed to the mobile terminal.

In some embodiments of the above apparatus, the processor is further configured to include in the acknowledgement: a first security key (e.g., PuK_SS); and a first digital signature (e.g., SIG1) generated using a second security key (e.g., PrK_CA), the first digital signature signing the first security key.

In some embodiments of any of the above apparatus, the processor is further configured to include in the acknowledgement a second digital signature (e.g., SIG2) generated using a third security key (e.g., PrK_SS), the second digital signature signing the copy of the nonce, the first security key, and the first digital signature.

In some embodiments of any of the above apparatus, the processor is further configured to include in the acknowledgement one or more of the following: (i) a set of GPS coordinates if the system query comprises a request for the set of GPS coordinates; (ii) selected system information signed using a digital signature if the system query comprises a request for the selected system information; and (iii) indication of support or non-support for one or more of selected operational features signed using a digital signature if the system query comprises a request for the indication.

In some embodiments of any of the above apparatus, the processor is further configured to generate the digital signature in a manner that enables the mobile terminal to verify the digital signature by processing the acknowledgement.

In some embodiments of any of the above apparatus, the antenna, the RF transceiver, and the processor are parts of a base station (e.g., 130, FIG. 1; 230, FIG. 2) capable of serving the mobile terminal using the RF signals.

In some embodiments of any of the above apparatus, the antenna and the RF transceiver are parts of a base station (e.g., 130, FIG. 1; 230, FIG. 2) operatively connected to a network core (e.g., 150, FIG. 1) and capable of serving the mobile terminal using the RF signals.

In some embodiments of any of the above apparatus, the processor is a part of the network core (e.g., a part of 240, FIG. 2).

In some embodiments of any of the above apparatus, the base station is configured to relay (e.g., using 208', FIG. 2) the system query to the network core.

In some embodiments of any of the above apparatus, the base station is configured to transmit the second RF signal in response to a control message (e.g., 212', FIG. 2) received from the network core, the control message including the acknowledgement.

According to yet another example embodiment disclosed above in reference to FIGS. 1-7, provided is a method of making a mobile terminal (e.g., 110, FIG. 1), the method comprising the steps of: operatively coupling an antenna (e.g., 116, FIG. 1) to a radio-frequency (RF) transceiver (e.g., 114, FIG. 1) configured to wirelessly transmit and receive RF signals via the antenna; and operatively coupling a processor (e.g., 112, FIG. 1) to the RF transceiver, the processor being configured to: generate (e.g., at 206, FIG. 2) a system query including a first nonce; operate the RF transceiver to transmit a first RF signal (e.g., 208, FIG. 2) having encoded thereon the system query, the first RF signal being directed to a base station (e.g., 230, FIG. 2); and process an acknowledgement encoded onto a second RF signal (e.g., 212, FIG. 2) received by the RF transceiver in response to the first RF signal to test authenticity of the base station, the test of authenticity being performed using the first nonce.

In some embodiments of the above method, the processor is further configured to: determine validity of a first digital signature (e.g., SIG1) included in the acknowledgement using a first security key (e.g., PuK_CA); compare a second nonce and the first nonce, the second nonce being a nonce included in the acknowledgement; and determine validity of a second digital signature (e.g., SIG2) included in the acknowledgement using a second security key (e.g., PuK_SS), wherein the second security key is included in the acknowledgement.

According to yet another example embodiment disclosed above in reference to FIGS. 1-7, provided is a method of making a network node (e.g., 130, FIG. 1), the method comprising the steps of: operatively coupling an antenna (e.g., 136, FIG. 1) to a radio-frequency (RF) transceiver (e.g., 134, FIG. 1) configured to wirelessly transmit and receive RF signals via the antenna; and operatively coupling a processor (e.g., 132 or CCF, FIG. 1) to the RF transceiver, the processor being configured to: generate (e.g., at 210, FIG. 2) an acknowledgement in response to a first RF signal (e.g., 208, FIG. 2) received by the RF transceiver from a mobile terminal (e.g., 110, FIG. 1), the first RF signal having encoded thereon a system query including a nonce, the acknowledgement including a copy of the nonce; and operate the RF transceiver to transmit a second RF signal (e.g., 212, FIG. 2) having encoded thereon the acknowledgement, the second RF signal being directed to the mobile terminal.

In some embodiments of the above method, the processor is further configured to include in the acknowledgement: a first security key (e.g., PuK_SS); a first digital signature (e.g., SIG1) generated using a second security key (e.g., PrK_CA), the first digital signature signing the first security key; and a second digital signature (e.g., SIG2) generated using a third security key (e.g., PrK_SS), the second digital signature signing the copy of the nonce, the first security key, and the first digital signature.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed digital processors. Herein, some embodiments are intended to cover program storage devices, e.g., digital data storage media, which are machine or computer readable and encode machine-executable programs of instructions where said instructions perform some or all of the steps of methods described herein. The program storage devices may be, e.g., digital memories, magnetic storage media, hard drives, and/or optically readable digital data storage media.

The functions of the various elements shown in the figures, including any functional blocks labeled as "processors" and/or "controllers," may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
   an antenna;
   a radio-frequency (RF) transceiver coupled to the antenna and configured to wirelessly transmit and receive RF signals via the antenna; and
   a processor coupled to the RF transceiver and configured to:
      generate a system query including a first nonce;
      cause the system query to comprise a request to include a set of GPS coordinates in a corresponding acknowledgement;
      operate the RF transceiver to transmit a first RF signal having encoded thereon the system query, the first RF signal being directed to a base station; and
      process the corresponding acknowledgement encoded onto a second RF signal received by the RF transceiver in response to the first RF signal to test authenticity of the base station, the test of authenticity being performed using the first nonce and the set of GPS coordinates; and
   wherein the antenna, the RF transceiver, and the processor are parts of a mobile terminal.

2. The apparatus of claim 1, wherein the processor is further configured to:
   determine validity of a first digital signature included in the corresponding acknowledgement using a first security key; and
   compare a second nonce and the first nonce, the second nonce being a nonce included in the corresponding acknowledgement.

3. The apparatus of claim 2, wherein the processor is further configured to determine validity of a second digital signature included in the corresponding acknowledgement using a second security key.

4. The apparatus of claim 3, wherein the second security key is included in the corresponding acknowledgement.

5. The apparatus of claim 1, wherein the processor is further configured to cause the request to include, in the corresponding acknowledgement,
   indication of support or non-support for one or more of selected operational features signed using a verifiable digital signature.

6. The apparatus of claim 1, wherein the processor is further configured to:
   read the set of GPS coordinates included in the corresponding acknowledgement.

7. The apparatus of claim 1, wherein the processor is further configured to:
   read at least one of (i) selected system information and (ii) indication of support or non-support for one or more of selected operational features included in the corresponding acknowledgement, the selected system information and the indication having been signed using a digital signature; and
   test authenticity of the base station using the digital signature.

8. The apparatus of claim 1,
   wherein the mobile terminal is configured to camp on a cell corresponding to the base station in response to the test of authenticity confirming the authenticity of the base station.

9. An apparatus comprising:
   an antenna;
   a radio-frequency (RF) transceiver coupled to the antenna and configured to wirelessly transmit and receive RF signals via the antenna; and
   a processor coupled to the RF transceiver and configured to:
      generate an acknowledgement in response to a first RF signal received by the RF transceiver from a mobile terminal, the first RF signal having encoded thereon a system query including a nonce, the acknowledgement including a copy of the nonce;
      operate the RF transceiver to transmit a second RF signal having encoded thereon the acknowledgement, the second RF signal being directed to the mobile terminal; and
      include in the acknowledgement:
         a first security key; and
         a first digital signature generated using a second security key, the first digital signature signing the first security key; and
         a second digital signature generated using a third security key, the second digital signature signing the copy of the nonce, the first security key, and the first digital signature.

10. The apparatus of claim 9, wherein the processor is further configured to include in the acknowledgement one or more of the following:
   a set of GPS coordinates when the system query comprises a request for the set of GPS coordinates;
   selected system information signed using a digital signature when the system query comprises a request for the selected system information; and indication of support or non-support for one or more of selected operational features signed using a digital signature when the system query comprises a request for the indication.

11. The apparatus of claim 10, wherein the processor is further configured to generate the digital signature in a manner that enables the mobile terminal to verify the digital signature by processing the acknowledgement.

12. The apparatus of claim 9, wherein the antenna, the RF transceiver, and the processor are parts of a base station capable of serving the mobile terminal using the RF signals.

13. The apparatus of claim 9,
wherein the antenna and the RF transceiver are parts of a base station connected to a network core and capable of serving the mobile terminal using the RF signals; and
wherein the processor is a part of the network core.

14. The apparatus of claim 13,
wherein the base station is configured to relay the system query to the network core; and
wherein the base station is configured to transmit the second RF signal in response to a control message received from the network core, the control message including the acknowledgement.

15. A method of making a network node, the method comprising:
coupling an antenna to a radio-frequency (RF) transceiver configured to wirelessly transmit and receive RF signals via the antenna; and
coupling a processor to the RF transceiver, the processor being configured to:
generate an acknowledgement in response to a first RF signal received by the RF transceiver from a mobile terminal, the first RF signal having encoded thereon a system query including a nonce, the acknowledgement including a copy of the nonce;
operate the RF transceiver to transmit a second RF signal having encoded thereon the acknowledgement, the second RF signal being directed to the mobile terminal; and
include in the acknowledgement:
a first security key;
a first digital signature generated using a second security key, the first digital signature signing the first security key; and
a second digital signature generated using a third security key, the second digital signature signing the copy of the nonce, the first security key, and the first digital signature.

* * * * *